US011076058B2

(12) United States Patent
Tanaka

(10) Patent No.: US 11,076,058 B2
(45) Date of Patent: Jul. 27, 2021

(54) IMAGE SCANNING APPARATUS WITH AN IMPROVED NOTIFICATION OF THE PRESENCE AND CONTENT OF SCANNED IMAGES

(71) Applicant: KYOCERA Document Solutions Inc., Osaka (JP)

(72) Inventor: Chigusa Tanaka, Osaka (JP)

(73) Assignee: Kyocera Document Solutions, Inc.

( * ) Notice: Subject to any disclaimer, the term of this patent is extended or adjusted under 35 U.S.C. 154(b) by 19 days.

(21) Appl. No.: 16/550,712

(22) Filed: Aug. 26, 2019

(65) Prior Publication Data

US 2020/0076967 A1 Mar. 5, 2020

(30) Foreign Application Priority Data

Aug. 30, 2018 (JP) .............................. JP2018-161379

(51) Int. Cl.
*H04N 1/00* (2006.01)
*H04N 1/32* (2006.01)

(52) U.S. Cl.
CPC ..... *H04N 1/00217* (2013.01); *H04N 1/00114* (2013.01); *H04N 1/00212* (2013.01); *H04N 1/00225* (2013.01); *H04N 1/32117* (2013.01); *H04N 2201/325* (2013.01); *H04N 2201/3226* (2013.01)

(58) Field of Classification Search
CPC ....... H04N 2201/3226; H04N 1/00225; H04N 1/00212; H04N 1/00217; H04N 1/32117; H04N 1/00114; H04N 2201/325
See application file for complete search history.

(56) References Cited

U.S. PATENT DOCUMENTS

| 2006/0007481 | A1* | 1/2006 | Kato | .................. | H04N 1/40062 |
| | | | | | 358/1.15 |
| 2012/0047213 | A1* | 2/2012 | Hanada | ................... | H04L 51/08 |
| | | | | | 709/206 |
| 2012/0235960 | A1* | 9/2012 | Maekawa | .......... | H04N 1/00938 |
| | | | | | 345/204 |

FOREIGN PATENT DOCUMENTS

JP 2006-311344 11/2006

* cited by examiner

*Primary Examiner* — Nicholas Pachol

(57) ABSTRACT

An image scanning unit scans a page image from a document and generates image data of the page image in accordance with a job request by a login user. A document file of the image data is generated, and saved in a specific folder. An additional information generating unit generates specific additional information that indicates content of the page image. A communication processing unit transmits a message including a network identifier of the document file to a destination user specified by the job request. A server unit transmits the document file upon receiving a transmission request that specifies the network identifier. Further, the communication processing unit (a) does not include the additional information into the message if the destination user is the login user and (b) includes the additional information into the message if the destination user is not the login user.

4 Claims, 3 Drawing Sheets

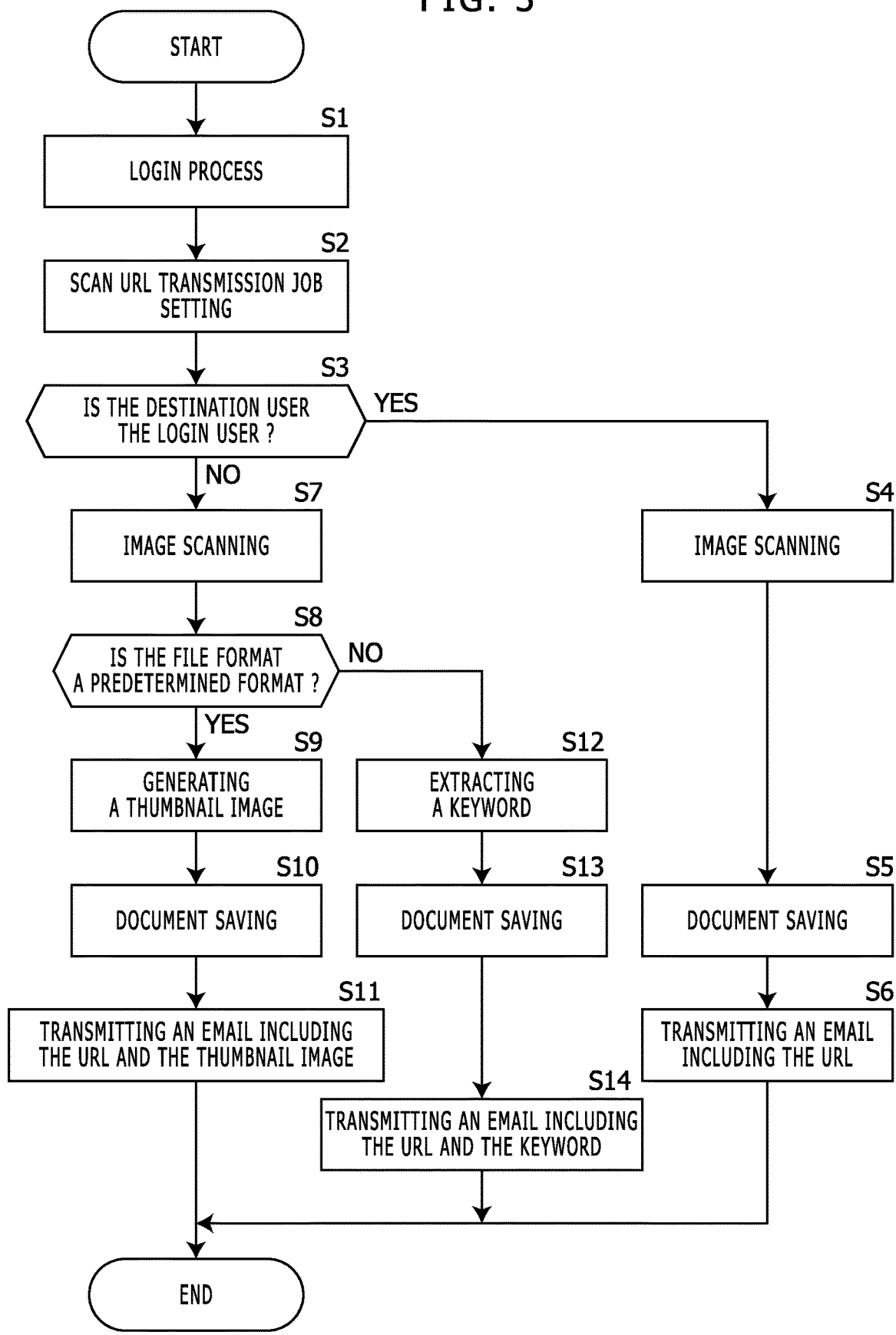

IMAGE SCANNING APPARATUS WITH AN IMPROVED NOTIFICATION OF THE PRESENCE AND CONTENT OF SCANNED IMAGES

CROSS-REFERENCE TO RELATED APPLICATIONS

This application relates to and claims priority rights from Japanese Patent Application No. 2018-161379, filed on Aug. 30, 2018, the entire disclosures of which are hereby incorporated by reference herein.

BACKGROUND

1. Field of the Present Disclosure

The present disclosure relates to an image scanning apparatus.

2. Description of the Related Art

An image scanning apparatus saves an image file of a document image (hereinafter, called "document file") scanned from a document into a box (folder), and transmits a message (email or the like) including a URL (Uniform Resource Locator) of the image file, and thereby provides a function that a user specifies the URL included in the message by operating a terminal apparatus or the like and downloads the image file (i.e. scan URL transmission job function).

However, even when a network identifier such as URL of the saved document file is informed to a user, the user hardly understand content of the document file from the network identifier.

Therefore, it may be proposed to insert into the aforementioned message additional information that indicates content of the document file, but it is not favorable because a large amount of such additional information results in increase of a transmission data amount although a transmission data amount is decreased by transmitting the network identifier instead of the document file.

SUMMARY

An image scanning apparatus according to an aspect of the present disclosure includes an image scanning unit, an image acquiring unit, an additional information generating unit, a communication processing unit, and a server unit. The image scanning unit is configured to scan a page image from a document and generate image data of the page image in accordance with a job request by a login user. The image acquiring unit is configured to acquire the image data, generate a document file of the image data, and save the document file into a specific folder in accordance with the job request. The additional information generating unit is configured to generate specific additional information that indicates content of the page image on the basis of the image data. The communication processing unit is configured to transmit a message including a network identifier of the document file to a specific destination user specified by the job request. The server unit is configured to transmit the document file upon receiving a transmission request that specifies the network identifier. Further, the communication processing unit (a) does not include the additional information into the message if the destination user is the login user and (b) includes the additional information into the message if the destination user is not the login user.

These and other objects, features and advantages of the present disclosure will become more apparent upon reading of the following detailed description along with the accompanied drawings.

BRIEF DESCRIPTION OF THE DRAWINGS

FIG. 3 shows a flowchart that explains a behavior of the image scanning apparatus shown in FIGS. 1 and 2.

DETAILED DESCRIPTION

Hereinafter, an embodiment according to an aspect of the present disclosure will be explained with reference to drawings.

Figure 1:
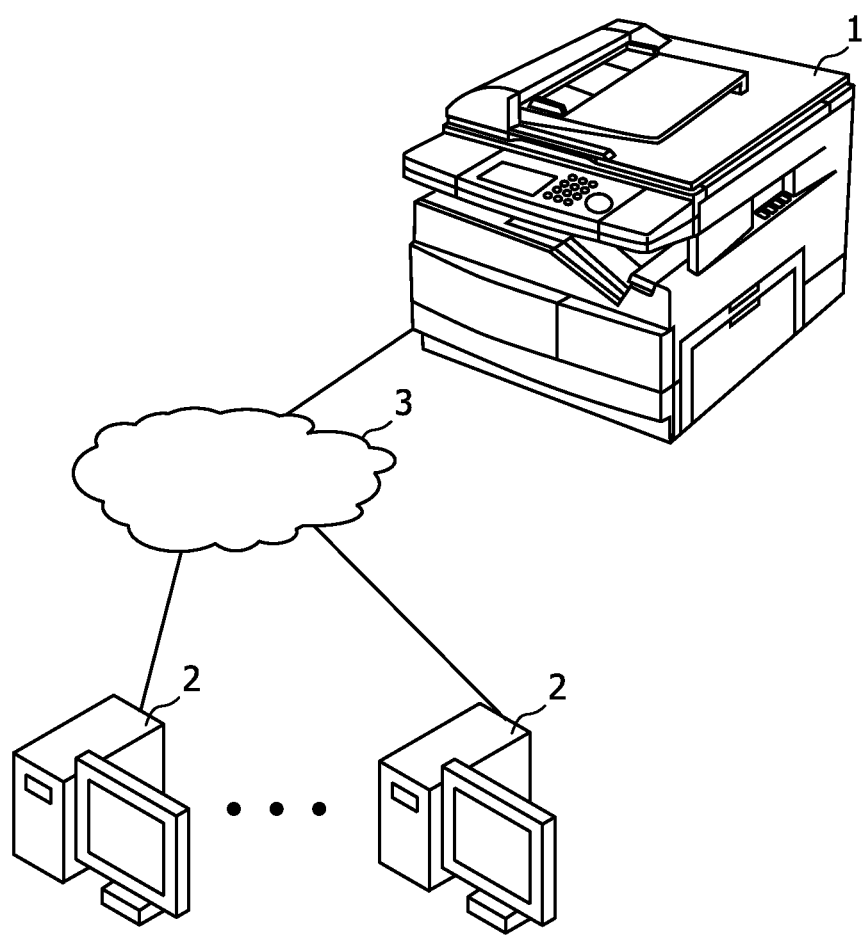
FIG. 1 shows a perspective view diagram that indicates an image scanning apparatus according to an embodiment of the present disclosure.

FIG. 1 shows a perspective view diagram that indicates an image scanning apparatus according to an embodiment of the present disclosure. In FIG. 1, the image scanning apparatus 1 is a multi function peripheral that has an image scanning function, and is a sort of an image scanning apparatus. A terminal apparatus 2 is a terminal apparatus such as personal computer operated by a user, and is capable of directly or indirectly communicating with the image scanning apparatus 1 through a network 3. For example, plural terminal apparatuses 2 respectively used by plural users are capable of communicating with the image scanning apparatus 1 through the network 3. The network 3 is Internet, a LAN (Local Area Network) or the like.

Figure 2:
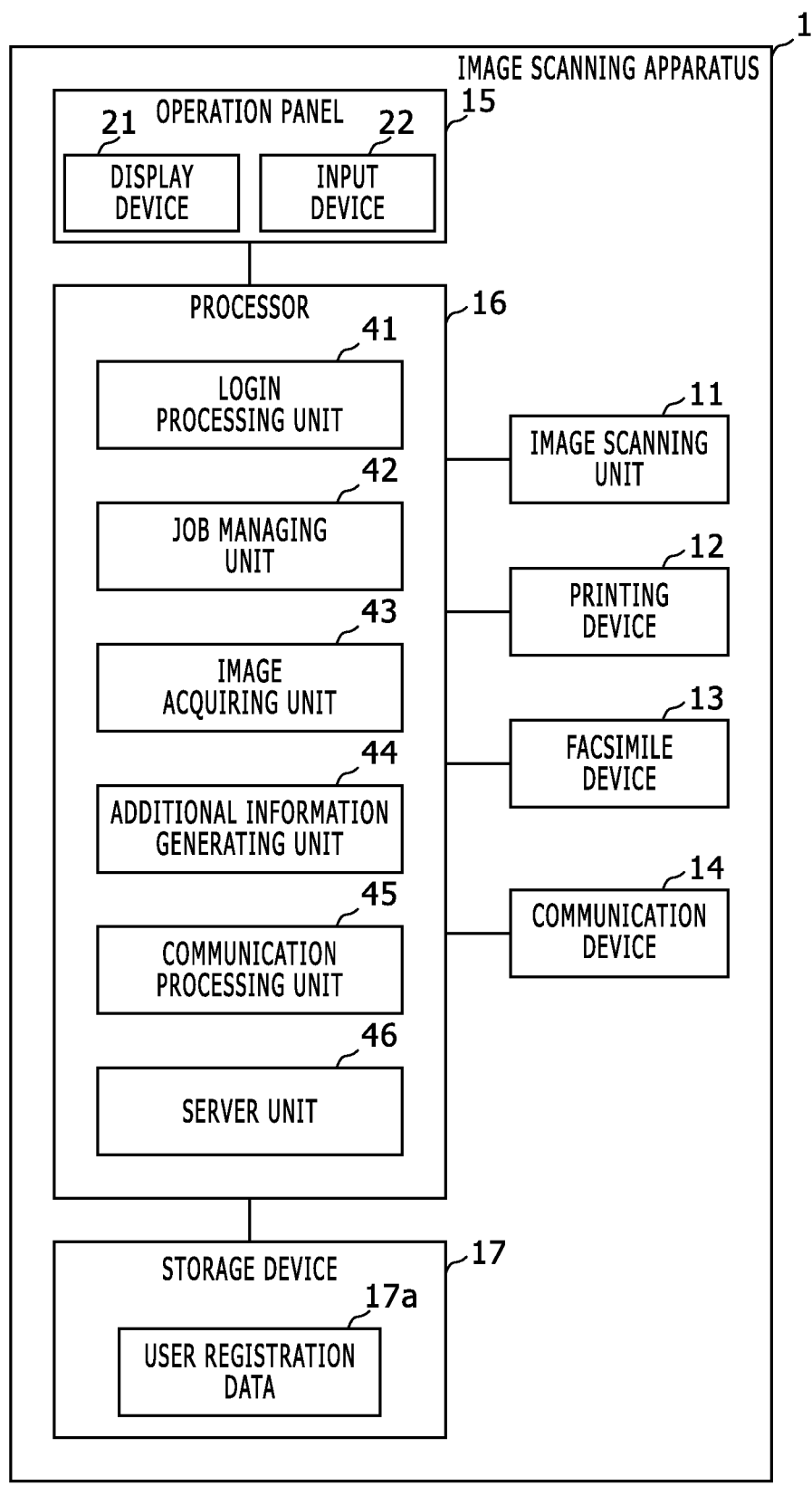
FIG. 2 shows a block diagram that indicates a configuration of the image scanning apparatus 1 shown in FIG. 1.

FIG. 2 shows a block diagram that indicates a configuration of the image scanning apparatus 1 shown in FIG. 1. The image scanning apparatus 1 shown in FIGS. 1 and 2 includes an image scanning unit 11, a printing device 12, a facsimile device 13, a communication device 14, an operation panel 15, a processor 16, a storage device 17, and the like.

The image scanning unit 11 optically scans one or more page images from a document including one or more pages put on a platen glass or fed by an automatic document feeder, and generates image data of the one or more page images.

The printing device 12 is an internal device that performs printing of an image based on the image data obtained with the scanning or the like.

The facsimile device 13 is an internal device that transmits the image data obtained with the scanning as a facsimile signal, and receives a facsimile signal and generates image data.

The communication device 14 is an internal device such as network interface that performs communication with the terminal apparatus 2 or the like through the network 3.

The operation panel 15 is arranged on an upper surface of a housing of the image scanning apparatus 1, and includes a display device 21 that displays a screen to a user and an input device 22 that receives a user operation performed by the user. The display device 21 is a liquid crystal display or the like. The input device 22 is a hard key, a touch panel that forms a soft key with the display device 21, and/or the like.

The processor 16 includes an ASIC (Application Specific Integrated Circuit), a computer and/or the like and the computer includes a CPU (Central Processing Unit), a ROM (Read Only Memory), a RAM (Random Access Memory), and the like, and the processor 16 acts as processing units using the ASIC, the computer and/or the like. Specifically, the processor 16 loads a program stored in the ROM, the storage device 17 or the like to the RAM, and executes the program with the CPU and thereby acts as processing units, namely by means of software, and/or acts as processing units using the ASIC and the like, namely by means of hardware.

The storage device 17 is a non-volatile storage device and stores user registration data 17a. The user registration data 17a includes user authentication information (a user ID and a password, or the like), and a user property information (a user name, a destination of data transmission such as email address, and the like).

Here the processor 16 acts as a login processing unit 41, a job managing unit 42, an image acquiring unit 43, an additional information generating unit 44, a communication processing unit 45, and a server unit 46.

The login processing unit 41 (a) displays a login screen (not shown) on the display device 21, (b) detects user authentication information inputted to the login screen by a user using the input device 22, (c) refers to the user registration data 17a and determines whether the inputted user authentication information is proper or not on the basis of the user registration data 17a, and (d) allows the user to log in and displays an operation screen such as a menu screen on the display device 21 if the inputted user authentication information is proper. Consequently, this user becomes a login user, and the login user operates the operation screen and thereby can cause the image scanning apparatus 1 to perform a job such as scan URL transmission job. If the inputted user authentication information is not proper (i.e. if the inputted user authentication information is not registered in the user registration data 17a), then the user is refused to log in, and the login screen is uninterruptedly displayed. Instead of referring to the user registration data 17a, the login processing unit 41 may access an authentication server (not shown) and thereby causes the authentication server to determine whether the inputted user authentication information is proper or not.

The job managing unit 42 performs a job such as scan URL transmission job using the internal devices when receiving a job request of the job. If the job is a scan URL transmission job, the job managing unit 42 performs the job using the image scanning unit 11, the image acquiring unit 43, the additional information generating unit 44 and the communication processing unit 45.

In a scan URL transmission job, a user operates the input device 22 and thereby selects a user as a destination of a message mentioned below and selects a file format of a saved document file. The job managing unit 42 determines the destination and the file format as job setting.

The image acquiring unit 43 acquires the image data generated by the image scanning unit 11, generates a document file of the image data (i.e. a document file including the image data, a document file including a text obtained from the image data with character recognition or the like), and saves the document file into a specific folder. This specific folder is allocated in a non-volatile storage device (flash memory, hard disk drive or the like) such as the internal storage device 17 or an external storage device (not shown).

For example, when a document file is generated of a document including plural pages in one job in accordance with job setting in a job request, generated and saved is one document file including page images of the plural pages (e.g. multipage TIFF file). Alternatively, for example, generated and saved is a document file in a WORD format, an EXCEL format or the like including a text obtained from each page image with character recognition.

In a scan URL transmission job, in accordance with a job request by a login user, the image scanning unit 11 scans a page image from a document and generates image data of the page image, and the image acquiring unit 43 generates a document file of the image data and saves the document file into a specific folder.

The additional information generating unit 44 generates specific additional information that indicates content of the aforementioned page image on the basis of the aforementioned image data.

The communication processing unit 45 transmits a message to a destination user using the communication device 14, the destination user is specified by the job request (i.e. the job setting), and the message includes a network identifier of the document file saved in the specific folder. This message is transmitted in accordance with a predetermined protocol. In this embodiment, the network identifier is a URL, and this message is transmitted as an email.

Thus, in a scan URL transmission job, the aforementioned document file is saved in a specific folder, and a message that includes a URL of the document file is transmitted.

This URL may be (a) a URL that directly indicates the document file, or (b) a URL that indicates a CGI (Common Gate Interface) and in which a parameter indicates the document file.

Specifically, the communication processing unit 45 (a) does not include the additional information into the message to be transmitted to the destination user if the aforementioned destination user is the login user and (b) includes the additional information into the message to be transmitted to the destination user if the aforementioned destination user is not the login user. If the additional information is not to be included in the message, then the additional information generating unit 44 does not perform the generation of the additional information.

In this embodiment, the aforementioned specific additional information is either a shrink image of the aforementioned page image or a keyword obtained from the aforementioned page image with character recognition. In other words, if the shrink image is included in the message, then the keyword is not included in the message; and if the keyword is included in the message, then the shrink image is not included in the message. In this embodiment, the aforementioned shrink image is a thumbnail image. The shrink image is generated by shrinking the page image by a predetermined shrink ratio. Further, the keyword is extracted from a text obtained from the page image with character recognition as a representative word of the text in accordance with a predetermined known method.

In this embodiment, the additional information generating unit 44 may select and generate the shrink image or the keyword as the additional information on the basis of a ratio of a text area in the page image and/or a ratio of an image area in the aforementioned page image. In such a case, if the ratio of the text area is larger than the ratio of the image area, then the keyword is selected as the additional information, and otherwise if not, the shrink image is selected as the additional information.

Further, in this embodiment, the additional information generating unit 44 may select and generate the shrink image or the keyword as the additional information on the basis of a file format of the document file. In such a case, for example, if the file format of the document file is one of TIFF format, JPEG format and POWERPOINT format, then the shrink image is selected as the additional information, and otherwise if not, the keyword is selected as the additional information.

Furthermore, in this embodiment, the additional information generating unit 44 may (a) count the number of characters in a text obtained from the aforementioned page image with character recognition, and (b) select and generate the shrink image or the keyword as the additional information on the basis of the number of characters. In such a case, if the number of characters in the text is larger than a predetermined threshold value, the keyword is selected as the additional information, and otherwise if not, the shrink image is selected as the additional information.

Furthermore, in this embodiment, if the additional information is set as the keyword obtained from the page image with character recognition, then the additional information generating unit 44 may select and generate one or more keywords as the additional information in accordance with the number of characters in a text obtained from the page image with character recognition. In such a case, when the number of characters in the text is large, a large number of the keywords are generated. For example, the number of the keywords may be set as a numerical value obtained by integerizing a product of the number of characters in the text and a predetermined ratio. If plural keywords are set as the additional information, then the plural keywords are words different from each other.

If the shrink image is included in the message, and the message is an email, then (a) the shrink image is embedded in a main text of an HTML (Hypertext Markup Language) mail as the email, (b) an image file of the shrink image is attached as an attachment file to a text mail as the email, or the like.

Further, the server unit 46 receives a transmission request that specifies the aforementioned network identifier (e.g. URL), and upon receiving the transmission request, determines and reads a document file corresponding to the network identifier, and transmits the document file as a response of the request to the requester. In accordance with a user operation, the terminal apparatus 2 acquires the aforementioned message (e.g. email) from a mail server using a mailer or the like, displays the message on a display device such as a liquid crystal display and saves the message in a storage device such as RAM or flash memory, and transmits a transmission request that specifies a network identifier described in the aforementioned message using a browser or the like such as web browser.

For example, the server unit 46 is a web server, receives a request that specifies a URL in accordance with HTTP (Hypertext Transfer Protocol), and upon receiving the request, reads and transmits as a response of the request a document file specified by the URL.

The following part explains a behavior of the aforementioned image scanning apparatus 1. FIG. 3 shows a flowchart that explains a behavior of the image scanning apparatus shown in FIGS. 1 and 2.

When this image scanning apparatus 1 starts, the login processing unit 41 displays a login screen on the display device 21. When a user inputs user authentication information, the login processing unit 41 performs user authentication based on the user authentication information as mentioned, and allows the user to log in if the user authentication succeeded (in Step S1).

Afterward, the login user operates the input device 22 and thereby requests a scan URL transmission job. The job managing unit 42 receives the job request, and upon receiving the job request, displays an input screen for job setting on the display device 21. The user performs a user operation to this input screen using the input device 22, and thereby specifies a destination user of a message to inform a network identifier (here, URL) of a document file to the user. For example, a list of users registered in the user registration data 17a is displayed on the display device 21, and a user's desired user is selected as the destination user in the list in accordance with the user operation. In addition, the user specifies a file format of the document file using the input device 22. As mentioned, the job setting is determined (in Step S2).

If the aforementioned destination user is the login user (in Step S3), then in accordance with a user operation, the image acquiring unit 43 controls the image scanning unit 11 and thereby causes the image scanning unit 11 to perform image scanning of a document and acquires image data of a page image of the document (in Step S4), and generates a document file including the image data in the specified file format (in Step S5), and subsequently, the communication processing unit 45 transmits an email including a URL of the document file to the specified destination user (i.e. an email address of the destination user registered in the user registration data 17a) using the communication device 14 (in Step S6). In this case, in the email, additional information such as thumbnail image or keyword is not included.

Contrarily, if the aforementioned destination user is not the login user (in Step S3), then in accordance with a user operation, the image acquiring unit 43 controls the image scanning unit 11 and thereby causes the image scanning unit 11 to perform image scanning of a document and acquires image data of a page image of the document (in Step S7); and subsequently, (a) if the specified file format is a predetermined format (here, TIFF format, JPEG format or POWERPOINT format) (in Step S8), then the additional information generating unit 44 selects a page image of a specific page among the acquired page image(s) and generates a thumbnail image by shrinking the selected page image (in Step S9), generates a document file including the image data in the specified file format and saves the document file into a specific folder (in Step S10); and subsequently, the communication control unit 45 transmits an email including the thumbnail image and a URL of the document file to the specified destination user using the communication device 14 (in Step S11).

If the aforementioned destination user is not the login user (in Step S3), then after acquiring the image data, (b) if the specified file format is not the predetermined format (in Step S8), the additional information generating unit 44 performs a character recognition process for the acquired page image and thereby extracts a text from the page image and extracts a keyword from the text (in Step S12), generates a document file including the image data in the specified file format and saves the document file into a specific folder (in Step S13); and subsequently, the communication control unit 45 transmits an email including the keyword and a URL of the document file to the specified destination user using the communication device 14 (in Step S14).

As mentioned, if the destination user is not the login user, then the specific additional information is included into the email that informs a URL of the document file.

Thus, if the destination user is the login user, then the specific additional information is not included in the email because the document is selected by the login user himself/herself and content of the document file is known by the login user, and consequently, transmission data amount is restrained. Contrarily, if the destination user is not the login user, then the specific additional information is included in the email such that the destination user easily understands content of the document file because the destination user does not know the document selected by the login user.

Afterward, the destination user operates the terminal apparatus 2 and thereby causes the terminal apparatus 2 to receive the email and display the additional information, and specifies a URL included in the email using the terminal apparatus 2 and thereby causes the terminal apparatus 2 to transmit a transmission request of the document file. Subsequently, the server unit 46 receives the transmission request, and upon receiving the transmission request, transmits the corresponding document file as a response; and the terminal apparatus 2 receives the document file and displays and/or saves the received document file.

As mentioned, in the aforementioned embodiment, in accordance with a job request by a login user, the image scanning unit 11 scans a page image from a document and generates image data of the page image, and the image acquiring unit 43 acquires the image data and generates a document file of the image data and saves the document file in a specific folder. The additional information generating unit 44 generates specific additional information on the basis of the image data, and the specific additional information indicates content of the page image. The communication processing unit 45 transmits a message including a network identifier of the document file to a specific destination user specified by the job request. The server unit 46 transmits the document file upon receiving a transmission request that specifies the network identifier. Further, the communication processing unit 45 (a) does not include the additional information into the message if the destination user is the login user and (b) includes the additional information into the message if the destination user is not the login user.

Consequently, such that a transmission data amount in a scan URL transmission job does not get larger than necessary, the specific additional information that indicates content of the document file is properly included into an email that informs a URL of the document file to a user.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image scanning apparatus, comprising:
   an image scanning unit configured to scan a page image from a document and generate image data of the page image in accordance with a job request by a login user;
   an image acquiring unit configured to acquire the image data, generate a document file of the image data, and save the document file in a specific file format chosen by the login user into a specific folder in accordance with the job request;
   an additional information generating unit configured to generate specific additional information that indicates content of the page image on the basis of the image data;
   a communication processing unit configured to transmit a message including a network identifier of the document file to a specific destination user specified by the job request;
   a server unit configured to transmit the document file upon receiving a transmission request that specifies the network identifier;
   wherein the communication processing unit (a) does not include the additional information into the message if the destination user is the login user and (b) includes the additional information into the message if the destination user is not the login user; and
   wherein the additional information is (a) a shrink image of the page image or (b) a keyword obtained from the page image with character recognition; and wherein the additional information generating unit selects and generates the shrink image or the keyword as the additional information on the basis of a file format of the document file chosen by the login user, wherein the file format indicates if the file contains text or image data.

2. The image scanning apparatus according to claim 1, wherein
   the additional information generating unit selects and generates the shrink image or the keyword as the additional information on the basis of a ratio of a text area in the page image and/or a ratio of an image area in the page image.

3. The image scanning apparatus according to claim 1, wherein
   the additional information generating unit selects and generates the shrink image or the keyword as the additional information on the basis of the number of characters in a text obtained from the page image with character recognition.

4. The image scanning apparatus according to claim 1, wherein if the additional information is a keyword obtained from the page image with character recognition, the additional information generating unit selects and generates one or more keywords as the additional information in accordance with the number of characters in a text obtained from the page image with character recognition.

* * * * *